United States Patent
Son et al.

(10) Patent No.: US 9,325,723 B2
(45) Date of Patent: Apr. 26, 2016

(54) PROXIMITY SERVICE SECURITY SYSTEM AND METHOD USING BEACON

(71) Applicant: Daegu Gyeongbuk Institute of Science and Technology, Dalseong-gun, Daegu (KR)

(72) Inventors: Jong Wuk Son, Daegu (KR); Kookrae Cho, Daegu (KR); Shi Quan Piao, Daegu (KR); Hye Min Seong, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 14/561,388

(22) Filed: Dec. 5, 2014

(65) Prior Publication Data

US 2015/0304341 A1    Oct. 22, 2015

(30) Foreign Application Priority Data

Apr. 16, 2014    (KR) .................. 10-2014-0045417

(51) Int. Cl.
 *G06F 21/50*    (2013.01)
 *H04L 29/06*    (2006.01)
 *H04W 12/08*    (2009.01)
 *H04W 4/00*    (2009.01)

(52) U.S. Cl.
 CPC ............. *H04L 63/107* (2013.01); *H04W 4/008* (2013.01); *H04W 12/08* (2013.01)

(58) Field of Classification Search
 CPC ...................................................... H04L 63/107
 USPC ............................................................. 726/4
 See application file for complete search history.

(56) References Cited

U.S. PATENT DOCUMENTS

| | | | |
|---|---|---|---|
| 8,768,306 B1* | 7/2014 | Ben Ayed | H04W 12/06 455/411 |
| 2007/0223432 A1* | 9/2007 | Badarinath | H04W 48/18 370/338 |
| 2009/0140043 A1* | 6/2009 | Graves | G06F 19/327 235/380 |
| 2013/0070744 A1 | 3/2013 | Baek et al. | |

FOREIGN PATENT DOCUMENTS

| KR | 1020020027316 A | 4/2002 |
|---|---|---|
| KR | 100725898 B1 | 6/2007 |

* cited by examiner

*Primary Examiner* — Peter Shaw
(74) *Attorney, Agent, or Firm* — Sughrue Mion, PLLC

(57) ABSTRACT

Provided are a system and method for securing security for a proximity service using a beacon signal transmitted by a beacon. A proximity service security system using a beacon includes the beacon configured to transmit a beacon signal while periodically changing identification information of the beacon signal and a server configured to verify validity of the beacon signal by receiving a validity check request signal for the beacon signal from a beacon receiver receiving the beacon signal and transmit a verification result to the beacon receiver.

14 Claims, 4 Drawing Sheets

PROXIMITY SERVICE SECURITY SYSTEM AND METHOD USING BEACON

CROSS-REFERENCE TO RELATED APPLICATION

This application claims priority to and the benefit of Korean Patent Application No. 10-2014-0045417, filed on Apr. 16, 2014, the disclosure of which is incorporated herein by reference in its entirety.

BACKGROUND

1. Field of the Invention

The present invention relates to a system and method for securing security for a proximity service using a beacon signal transmitted by a beacon.

2. Discussion of Related Art

Apple's iBeacon and PayPal's Beacon are technologies for providing a proximity location-based service based on Bluetooth 4.0 (Bluetooth Smart).

In beacon technology, information is automatically transmitted to a device. The beacon technology advantageously has a wider data transmission range than near field communication (NFC) which belongs to the same field of technology as the beacon technology.

While NFC requires contact in practice because it can only be used with a range of about 4 centimeters, a beacon can be used within a range of as much as 50 meters.

In addition, in order to use NFC, a dedicated chip needs to be embedded in a device. However, because a beacon uses Bluetooth, there is an advantage in that compatibility with a general smartphone is excellent.

That is, when this beacon technology is used, the user may use a proximity location-based service (advertisement, payment, or the like) without a separate action of touching a smartphone or a beacon reception device to a recognizer.

However, there is a problem in that security is vulnerable because information about a proximity universally unique identifier (UUID), a major number, and a minor number transmitted by a beacon according to the conventional technology may be easily hijacked by a malicious user.

That is, there is a problem in that a smooth location-based service may not be provided to a proper user when a beacon signal hijacked and duplicated by the malicious user is retransmitted in an arbitrary place that was not considered at the time of setting the location-based service.

FIG. 1 is a diagram illustrating a beacon service system according to conventional technology.

The beacon service system according to the conventional technology is constituted of a beacon 10 configured to transmit a beacon signal, a beacon receiver 20 configured to receive the beacon signal transmitted from the beacon, and a server 30 configured to provide a proximity-based service. In some cases, the proximity-based service provided by the server 30 may be included in the beacon receiver 20.

The beacon 10 transmits a proximity UUID, a major number, and a minor number so as to indicate a region in which the beacon 10 is located or indicate a service.

The beacon receiver 20 executes the proximity-based service when a beacon signal suitable for a condition is detected by monitoring the beacon signal. This beacon receiver 20 may detect the beacon 10 using only the proximity UUID or detect the beacon 10 when all of the proximity UUID, the major number, and the minor number satisfy the condition.

The beacon receiver 20 monitors the beacon signal transmitted by the beacon 10. When the beacon receiver 20 registers a proximity UUID "1" as a region 1, the beacon receiver 20 receives the location-based service when the beacon receiver 20 enters the region 1. At this time, the major number and the minor number are used as IDs for providing additional location information.

For example, the beacon receiver 20 sets a region as in "CLBeaconRegion*region=[[CLBeaconRegion alloc] initWithProximityUUID:[[NSUUID alloc] initWithUUIDString:@"2F234454-CF6D-4A0E-ADF2-F4911BA9FFA6"]major: 1 minor: 1 identifier: @"region1"];."

When a region is set using only a specific proximity UUID, the beacon receiver 20 monitors the beacon 10 using the proximity UUID regardless of the major number and the minor number.

The beacon service system according to the conventional technology directly exposes and transmits the proximity UUID, the major number, and the minor number of fixed values so as to provide a convenient proximity-based service for a large number of unspecified users according to service characteristics.

Cases in which this information is easily hijacked and duplicated by a malicious user and a beacon signal is retransmitted at a wrong position occur.

That is, the beacon service system according to the conventional technology has a problem in that a proximity-based service is not smoothly provided because security is vulnerable and a utilization range of the beacon is not extended.

SUMMARY OF THE INVENTION

An object of the present invention is to provide a proximity service security system and method using a beacon for securing reliability and security for a beacon signal by determining whether the beacon signal transmitted by the beacon is valid.

According to one aspect of the present invention, there is provided a proximity service security system using a beacon, the proximity service security system including: the beacon configured to transmit a beacon signal while periodically changing identification information of the beacon signal; and a server configured to verify validity of the beacon signal by receiving a validity check request signal for the beacon signal from a beacon receiver receiving the beacon signal and transmit a verification result to the beacon receiver.

According to another aspect of the present invention, there is provided a proximity service security method using a beacon, the proximity service security method including: a first step of receiving and monitoring a beacon signal in which identification information is periodically changed from the beacon; a second step of determining whether the beacon signal monitored in the first step is a signal suitable for a preset condition; a third step of transmitting a validity check request signal for the identification information included in the beacon signal when it is determined that the beacon signal is suitable for the preset condition in the second step and determining whether the beacon signal is valid according to a validity check result; and a fourth step of receiving a service use token when it is determined that the beacon signal is valid in the third step and receiving a proximity-based service for the service use token.

According to still another aspect of the present invention, there is provided a beacon receiver for receiving a beacon signal, wherein the beacon receiver receives the beacon signal in which identification information is periodically changed from a beacon and determines validity of the beacon signal by transmitting a validity check request signal for the beacon signal to a server synchronized with the beacon.

The proximity service security system and method using the beacon according to the present invention have an advantageous effect in that it is possible to solve a vulnerable point of security such as retransmission that occurs when a beacon signal is hijacked and duplicated by a malicious user by determining whether the beacon signal is valid using identification information included in the beacon signal transmitted by the beacon.

There is an advantageous effect in that identification information of the beacon signal transmitted by the beacon is periodically changed and the changed identification information is updated in a server for synchronization, so that the beacon receiver determines whether the identification information of the beacon signal matches identification information synchronized in the server and reliability for a validity determination of the beacon signal is secured.

There is an advantageous effect in that security is secured when a plurality of proximity services are received by switching an operating mode according to a proximity UUID and receiving a proximity service after it is determined whether identification information of the beacon signal transmitted along with the proximity UUID is valid.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Preferred exemplary embodiments of the present invention will be specifically described below with reference to the accompanying drawings.

Figure 1:
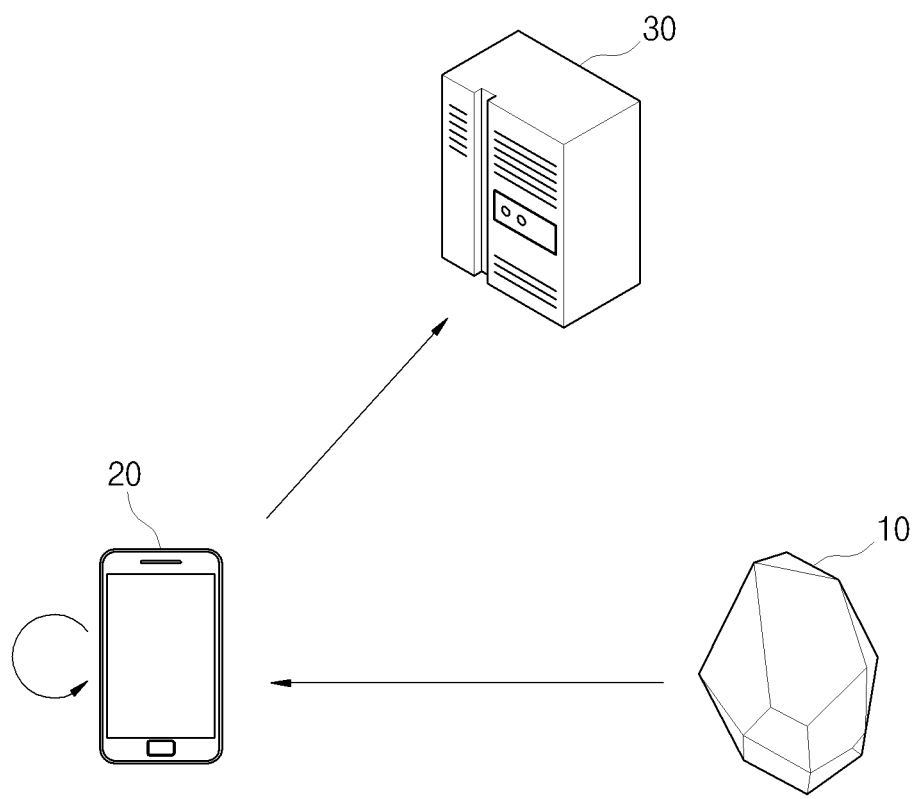
FIG. 1 is a diagram illustrating a beacon service system according to conventional technology.
Figure 2:
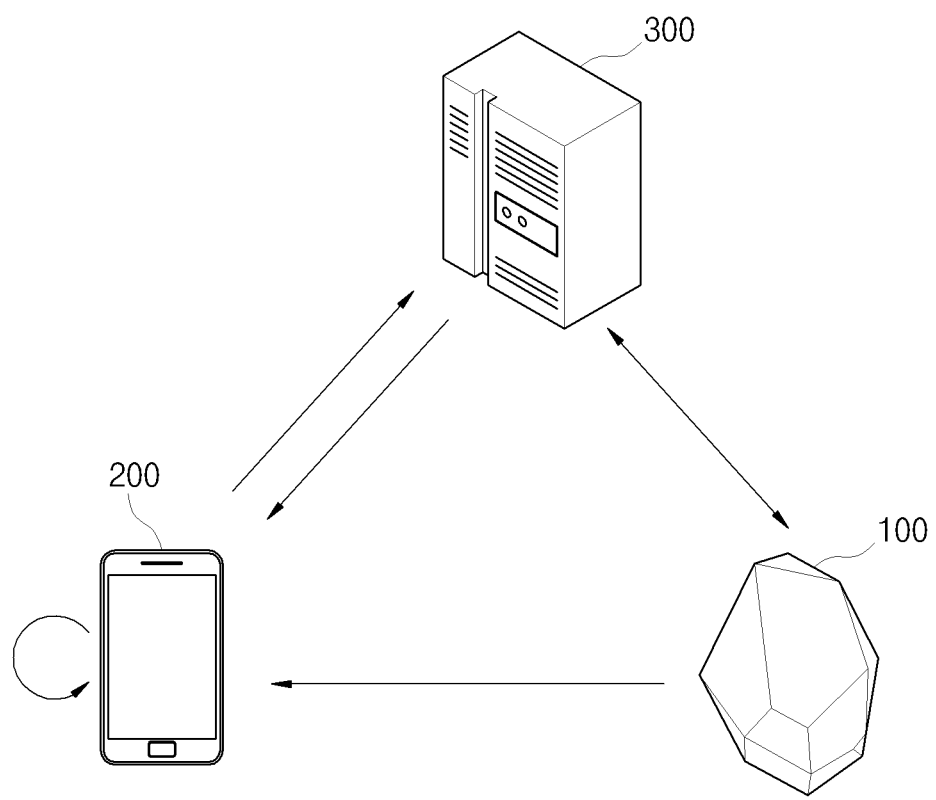
FIG. 2 is a diagram illustrating a proximity service security system using a beacon according to an exemplary embodiment of the present invention.

FIG. 2 is a diagram illustrating a proximity service security system using a beacon according to the exemplary embodiment of the present invention.

As illustrated in FIG. 2, the proximity service security system using the beacon according to the exemplary embodiment of the present invention includes the beacon 100 configured to transmit a beacon signal while periodically changing identification information of the beacon signal and a server 300 configured to verify validity of the beacon signal by receiving a validity check request signal for the beacon signal from a beacon receiver 200 receiving the beacon signal and transmit a verification result to the beacon receiver 200.

The beacon 100 includes beacon identification information within the beacon signal so as to indicate a region in which the beacon 100 is located and indicate a service to be provided by the beacon and transmits the beacon signal to the beacon receiver 200 and the server 300.

This beacon identification information includes a proximity UUID, a major number, and a minor number.

The proximity UUID used in this specification is defined as an ID for identifying an entity for providing a proximity-based service to be provided by the beacon 100, that is, a service provider (service providing company). The major number is defined as an ID for identifying a group including the beacon 100. The minor number is defined as an ID for identifying each beacon 100 within the group including the beacon 100.

Although the major number and the minor number are represented and described as x, y, w, and z for ease of understanding by those skilled in the art in this specification, the concept of the major number and the minor number includes numbers, nouns, hex codes, binary codes, and the like available as IDs for representing a corresponding group and a corresponding beacon.

In order to solve a vulnerable point of security of the beacon service system according to the conventional technology in terms of beacon signal retransmission or the like in a wrong place according to hijacking and duplication by a third party, the beacon 100 according to the exemplary embodiment of the present invention transmits a beacon signal after changing identification information included in the beacon signal according to a preset scheme. This preset scheme will be described later.

The beacon 100 according to the exemplary embodiment of the present invention transmits the beacon signal including the identification information to the beacon receiver 200 and the server 300. The beacon signal is transmitted after changing at least one of the major number and the minor number which are identification information to be included in the beacon signal.

Hereinafter, for ease of understanding by those skilled in the art, an example in which both the major number and the minor number are changed will be described. In the exemplary embodiment of the present invention, the beacon 100 changes only the major number and the server 300 may determine validity of the beacon signal by determining the conformity of the changed major number. Also, the beacon 100 changes only the minor number and the server 300 may determine validity of the beacon signal by determining the conformity of the changed minor number.

The beacon 100 transmits a proximity UUID "1," a major number "a," and a minor number "b" as identification information included in the beacon signal before a change, and the server 300 stores the identification information before the change.

In order to solve the vulnerable point of security that occurs when the major number and the minor number are continuously transmitted without change, the beacon 100 changes the major number and the minor number according to a preset cycle (for example, 10 minutes).

At this time, when the major number and the minor number are changed according to a given rule, this rule may also be hijacked by the third party. Accordingly, it is preferable for the beacon 100 to preset a group of IDs in an identifiable form such as a number, a letter, a hex code, or a binary code, arbitrarily select an ID belonging to the group, and change the major number and the minor number.

According to this identification information change of the beacon 100, the beacon 100 transmits a proximity UUID of "1," a major number of "x," and a minor number of "y" after the change.

At this time, the beacon 100 transmits the changed identification information to the server 300, and the identification information (the major number a and the minor number b) of the beacon 100 pre-stored in the server 300 before the change is updated to the identification information (the major number x and the minor number y) after the change.

That is, the beacon 100 changes the identification information and transmits the changed identification information. The identification information is updated in the server 300. Synchronization with the server 300 is acquired by causing the identification information of the beacon 100 stored by the server 300 to match the identification information of the beacon 100 transmitted by the beacon 100.

The beacon receiver 200 receives the beacon signal (the proximity UUID 1, the major number x, and the minor number y) after the change from the beacon 100, and transmits a validity check request signal for determining validity of the beacon signal to the server 300.

Because the server 300 stores the identification information of the beacon 100 in synchronization with the beacon 100, it is determined whether the identification information of the beacon signal stored by the server 300 synchronized with the beacon 100 matches the identification information of the beacon signal received by the beacon receiver 200 at a point in time at which the validity check request signal is received from the beacon receiver 200.

According to whether the identification information matches, the server 300 verifies the validity of the beacon signal received by the beacon receiver 200 and transmits a verification result to the beacon receiver 200.

According to the exemplary embodiment of the present invention, the server 300 transmits a service use token to the beacon receiver 200 along with a verification complete signal indicating that the beacon signal is valid because the major number is x and the minor number is y in the identification information stored by the server 300 synchronized with the beacon 100 and the major number x and the minor number y match the major number and the minor number of the beacon signal received by the beacon receiver 200.

The beacon receiver 200 receives a proximity service for a corresponding beacon signal by receiving the service use token from the server 300.

Figure 3:
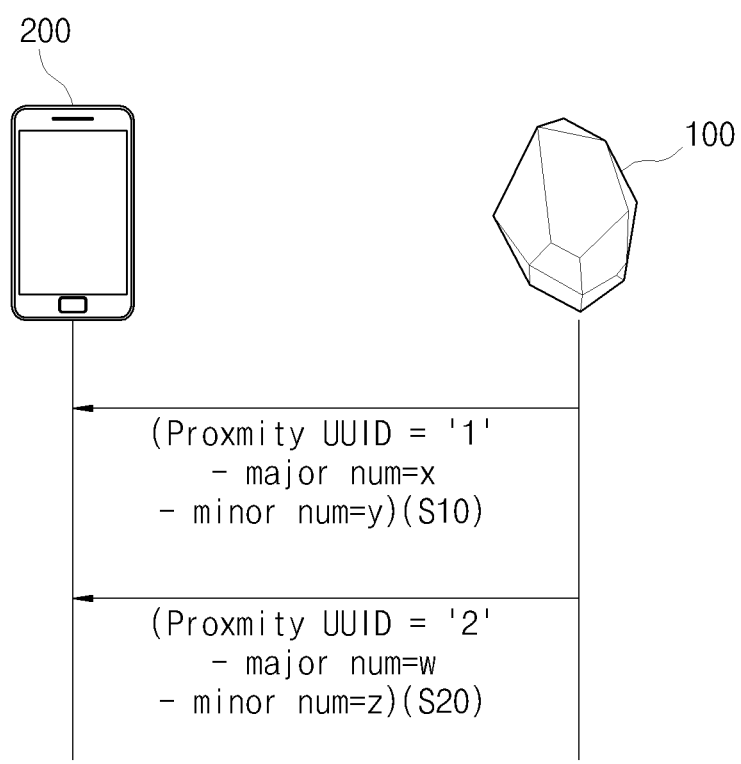
FIG. 3 is a conceptual diagram illustrating an operation process of a beacon and a beacon receiver for a plurality of proximity UUIDs according to an exemplary embodiment of the present invention.

FIG. 3 is a conceptual diagram illustrating an operation process of the beacon 100 and the beacon receiver 200 for a plurality of proximity UUIDs according to an exemplary embodiment of the present invention.

The beacon receiver 200 stores a plurality of proximity UUIDs that are capable of being transmitted by the beacon 100.

According to the exemplary embodiment of the present invention, the beacon receiver 200 registers a proximity UUID 1 and a proximity UUID 2 of the beacon signal received from the beacon 100 as a region 1 and a region 2, respectively.

The beacon receiver 200 receives the beacon signal after this registration process. When the proximity UUID of the received beacon signal is 1 or 2, the entry into each region (region 1 or 2) is detected and a proximity-based service corresponding to each region is received.

In step S10, the beacon 100 transmits a first beacon signal (the proximity UUID 1, a major number x, and a major number y) to the beacon receiver 200.

At this time, the beacon receiver 200 receives the first beacon signal and transmits a check request signal for determining whether the major number and the minor number of the beacon signal stored by the server 300 synchronized with the beacon 100 match the major number and the minor number of the first beacon signal received by the beacon receiver 200 to the server 300.

Although the beacon receiver 200 may transmit the check request signal for determining the conformity of at least one of the major number and the minor number to the server 300 according to the exemplary embodiment of the present invention, an example in which the conformity for both the major number and the minor number is checked will be described below.

When the server 300 determines that the major number and the minor number stored in the server 300 match the major number and the minor number received by the beacon receiver 200, the server 300 verifies the validity of the beacon signal received by the beacon receiver 200 and transmits a verification result and a service use token to the beacon receiver 200.

When a given time (for example, 8 hours) has elapsed after step S10, the beacon 100 transmits a second beacon signal (a proximity UUID 2, a major number w, and a minor number z) to the beacon receiver 200 in step S20.

At this time, the beacon receiver 200 receives the second beacon signal and transmits the check request signal for determining whether the major number and the minor number of a corresponding beacon signal stored by the server 300 synchronized with the beacon 100 match the major number and the minor number of the second beacon signal received by the beacon receiver 200 to the server 300.

When the server 300 determines that the major number and the minor number stored in the server 300 match the major number and the minor number of the second beacon signal received by the beacon receiver 200, the server 300 verifies that the beacon signal received by the beacon receiver 200 is valid and transmits a verification result and the service use token to the beacon receiver 200.

According to the exemplary embodiment of the present invention illustrated in FIG. 3, the beacon 100 is applicable to communication service technology for events that occur at given time intervals (going to work, coming home from work, going to school, and coming home from school) as well as technology using simple communication associated with advertisement or information delivery. There is an advantageous effect in that security is secured by verifying whether the identification information of the beacon signal matches.

For example, a worker may identify a meeting schedule, an important notice, and the like from the beacon receiver 200 receiving the first beacon signal from the beacon 100 when going to work, input information on a time of arrival at work, identify a real-time traffic situation through the beacon receiver 200 receiving the second beacon signal from the beacon 100 when coming home from work, and input information on a time at which he or she leaves work.

Figure 4:
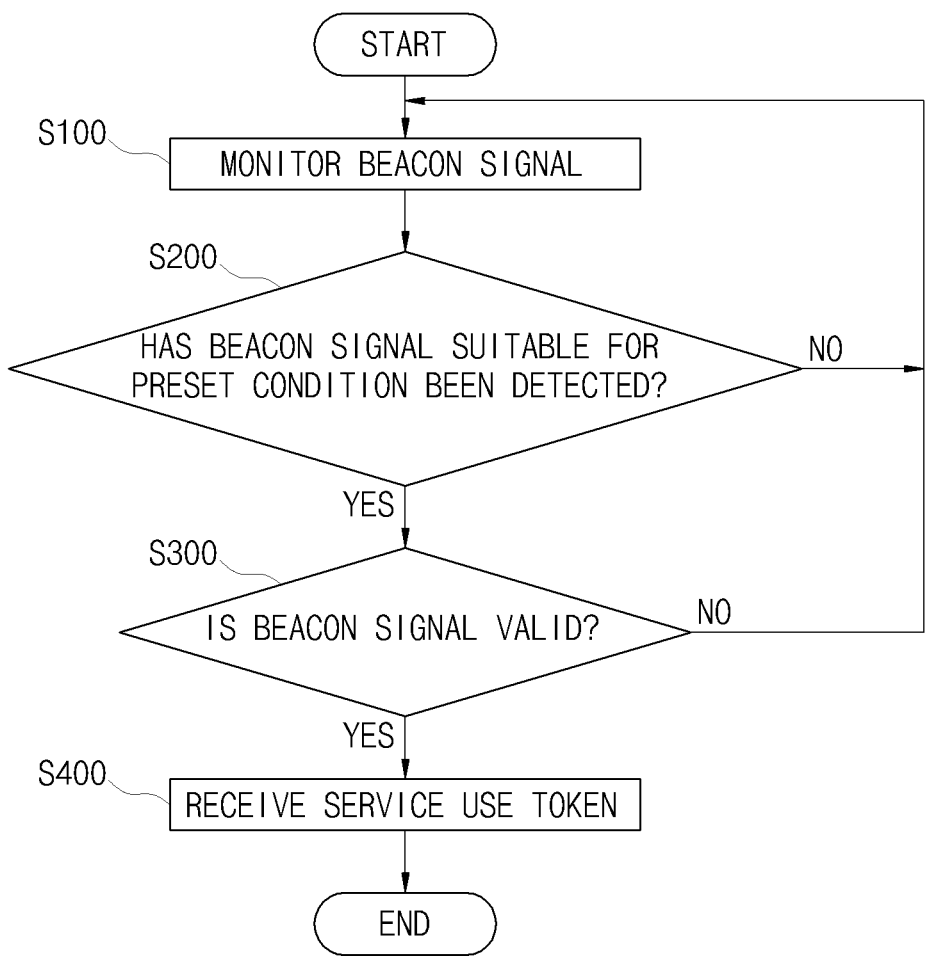
FIG. 4 is a flowchart illustrating a proximity service security method using the beacon according to an exemplary embodiment of the present invention.

FIG. 4 is a flowchart illustrating a proximity service security method using the beacon according to an exemplary embodiment of the present invention.

As illustrated in FIG. 4, the proximity service security method using the beacon according to the exemplary embodiment of the present invention includes a first step (S100) of receiving and monitoring a beacon signal in which identification information is periodically changed from the beacon 100; a second step (S200) of determining whether the beacon signal monitored in the first step is a signal suitable for a preset condition; a third step (S300) of transmitting a validity check request signal for the identification information included in the beacon signal when it is determined that the beacon signal is suitable for the preset condition in the second step (S200) and determining whether the beacon signal is valid according to a validity check result; and a fourth step (S400) of receiving a service use token when it is determined that the beacon signal is valid in the third step (S300) and receiving a proximity-based service for the service use token.

The beacon signal received in the first step (S100) includes a proximity UUID which is an ID for an entity for providing a proximity-based service provided by the beacon 100 as identification information, a major number which is an ID for identifying a group including the beacon 100, and a minor number which is an ID of identifying each beacon 100 within the group including the beacon 100.

In the second step (S200), it is determined whether the proximity UUID of the received identification information matches a proximity UUID corresponding to a region already registered within the beacon receiver 200. When the proximity UUIDs match, it is determined that a beacon signal suitable for a preset condition is detected.

The proximity service security method using the beacon according to the exemplary embodiment of the present invention further includes, before the first step (S100), synchronizing the beacon signal transmitted by the beacon 100 with the beacon signal stored by the server 300 by updating the beacon signal transmitted by the beacon 100 in the server 300. That is, the beacon signal transmitted by the beacon 100 is updated in the server 300 and the beacon 100 and the server 300 are synchronized.

In the third step (S300), it is determined whether the received beacon signal is valid using at least one of the major number and the minor number transmitted along with the proximity UUID.

At this time, in the third step, the beacon receiver 200 transmits a validity check request signal to the server 300 so as to determine whether the major number/minor number included in the received beacon signal matches the major number/minor number updated in the server 300 and determines that the beacon signal received from the beacon 100 is valid when the validity check result received from the server 300 is "valid."

In the fourth step (S400), when the identification result of the third step indicates that the beacon signal is valid, the beacon receiver 200 receives the service use token from the server 300 and receives a proximity service according to this service use token.

The exemplary embodiments of the present invention have been described above. It will be understood by one of ordinary skill in the art that various changes in form and details may be made therein without departing from the spirit and scope of the exemplary embodiments as defined by the following claims. The exemplary embodiments should be considered in a descriptive sense only, and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. A proximity service security system using a beacon, the proximity service security system comprising:
   the beacon configured to transmit a beacon signal while periodically changing identification information of the beacon signal; and
   a server configured to verify validity of the beacon signal by receiving a validity check request signal for the beacon signal from a beacon receiver receiving the beacon signal and transmit a verification result to the beacon receiver,
   wherein the beacon transmits the beacon signal including a proximity universally unique identifier (UUID) which is an ID for an entity for providing a proximity-based service, a major number which is an ID for a group including the beacon, and a minor number which is an individual ID of the beacon,
   wherein the beacon transmits the beacon signal after changing at least one of the major number and the minor number according to a preset cycle, and
   wherein the beacon sets a group of IDs, randomly selects an ID belonging to the group, and changes the at least one of the major number and the minor number.

2. The proximity service security system of claim 1, wherein the beacon acquires synchronization by updating identification information pre-stored in the server to changed identification information.

3. The proximity service security system of claim 2, wherein the server verifies the validity of the beacon signal by comparing identification information updated in the server to identification information of the beacon signal received by the beacon receiver from the beacon according to the received validity check request signal and transmits a verification result to the beacon receiver.

4. The proximity service security system of claim 3, wherein the server transmits a validity verification complete signal and a service use token to the beacon receiver when the major number included in the beacon signal received from the beacon receiver matches the major number included in the updated identification information of the beacon.

5. The proximity service security system of claim 3, wherein the server transmits a validity verification complete signal and a service use token to the beacon receiver when the minor number included in the beacon signal received from the beacon receiver matches the minor number included in the updated identification information of the beacon.

6. A proximity service security method using a beacon, the proximity service security method comprising:
   a first step of receiving and monitoring a beacon signal in which identification information is periodically changed from the beacon;
   a second step of determining whether the beacon signal monitored in the first step is a signal suitable for a preset condition;
   a third step of transmitting a validity check request signal for the identification information included in the beacon signal when it is determined that the beacon signal is suitable for the preset condition in the second step and determining whether the beacon signal is valid according to a validity check result; and
   a fourth step of receiving a service use token when it is determined that the beacon signal is valid in the third step and receiving a proximity-based service for the service use token,
   wherein the first step includes: receiving the beacon signal including a universally unique identifier (UUID), a major number, and a minor number,
   wherein the beacon signal includes at least one of the major number and the minor number which are changed according to a preset cycle, and
   wherein the beacon signal includes the at least one of the major number and the minor number selected as a candidate ID belonging to an ID group.

7. The proximity service security method of claim 6, further comprising:
   before the first step, acquiring synchronization with the beacon by receiving the beacon signal and updating identification information of a pre-stored beacon signal using identification information of the received beacon signal.

8. The proximity service security method of claim 6, wherein the second step includes:
   determining that the monitored beacon signal is a signal suitable for a preset condition when a proximity UUID of the received beacon signal matches a pre-stored proximity UUID.

9. The proximity service security method of claim 6, wherein the third step includes:
   transmitting the validity check request signal that is a check request signal for determining whether the changed identification information of the major number and the minor number of the beacon signal matches the identification information updated in the server.

10. The proximity service security method of claim 9, wherein the third step includes:
    receiving a validity verification complete signal when the changed major number matches the major number of the beacon updated in the server.

11. The proximity service security method of claim 9, wherein the third step includes:
    receiving a validity verification complete signal when the changed minor number matches the minor number of the beacon updated in the server.

12. A beacon receiver for receiving a beacon signal, wherein the beacon receiver receives the beacon signal in which identification information is periodically changed from a beacon and determines validity of the beacon signal by transmitting a validity check request signal for the beacon signal to a server synchronized with the beacon,
    wherein the beacon receiver receives a service use token from the server when the identification information of the beacon signal received from the beacon matches the identification information stored by the server synchronized with the beacon, and
    wherein the beacon receiver receives the beacon signal including at least one of a major number or a minor number changed as an ID belonging to a group according to a preset cycle.

13. The beacon receiver of claim 12, wherein the beacon receiver transmits the validity check request signal when a proximity UUID included in the received beacon signal matches a pre-stored proximity UUID.

14. The beacon receiver of claim 12, wherein the beacon receiver receives a validity verification complete signal when the changed major number included in the received beacon signal matches the major number of the beacon stored by the server synchronized with the beacon or when the changed minor number included in the received beacon signal matches the minor number of the beacon stored by the server synchronized with the beacon.

\* \* \* \* \*